US012709198B2

(12) United States Patent
Kostin et al.

(10) Patent No.: US 12,709,198 B2
(45) Date of Patent: Aug. 18, 2026

(54) RAIL ASSEMBLY FOR A LONGITUDINAL SEAT ADJUSTMENT SYSTEM OF A VEHICLE SEAT, AND VEHICLE SEAT

(71) Applicant: Brose Fahrzeugteile SE & Co. Kommanditgesellschaft, Coburg, Coburg (DE)

(72) Inventors: Sergej Kostin, Coburg (DE); Ulf Hartmann, Neustadt bei Coburg (DE)

(73) Assignee: Brose Fahrzeugteile SE & Co. Kommanditgesellschaft, Coburg, Coburg (DE)

( * ) Notice: Subject to any disclaimer, the term of this patent is extended or adjusted under 35 U.S.C. 154(b) by 45 days.

(21) Appl. No.: 19/018,094

(22) Filed: Jan. 13, 2025

(65) Prior Publication Data

US 2025/0145060 A1 May 8, 2025

Related U.S. Application Data

(63) Continuation of application No. PCT/EP2022/082230, filed on Nov. 17, 2022.

(30) Foreign Application Priority Data

Jul. 13, 2022 (DE) ..................... 10 2022 207 168.9

(51) Int. Cl.
*F16M 13/00* (2006.01)
*B60N 2/07* (2006.01)

(52) U.S. Cl.
CPC .................................. *B60N 2/0715* (2013.01)

(58) Field of Classification Search
CPC .. B60N 2/0715; B60N 2/0705; B60N 2/4221; B60N 2/4228; B60N 2/073
See application file for complete search history.

(56) References Cited

U.S. PATENT DOCUMENTS 5,961,088 A * 10/1999 Chabanne ............ B60N 2/0818 248/429
6,116,561 A * 9/2000 Christopher ......... B60N 2/0715 297/216.16

(Continued)

FOREIGN PATENT DOCUMENTS

JP H0479732 U 7/1992
WO 2013161620 A1 10/2013

(Continued)

*Primary Examiner* — Amy J. Sterling
(74) *Attorney, Agent, or Firm* — Laurence A. Greenberg; Werner H. Stemer; Ralph E. Locher

(57) ABSTRACT

A rail assembly for a longitudinal seat adjustment system of a vehicle seat has a lower rail for fastening to a vehicle floor and an upper rail for coupling to the vehicle seat. The upper rail sits form-fittingly in a profile longitudinal slot of the lower rail and it has a number of load rollers supporting the upper rail on a rail bottom of the lower rail for movement in a rail longitudinal direction. The lower and upper rails have mutually engaging form-fitting contours. The contours of the upper rail extend over the load rollers and have recesses in the region of each of the load rollers, through which the load rollers at least partly project, or can project when a load is applied. The lower rail has support edges that face towards the rail bottom and are aligned with the load rollers in the rail height direction.

33 Claims, 5 Drawing Sheets

(56) References Cited

U.S. PATENT DOCUMENTS

| | | | | |
|---|---|---|---|---|
| 7,309,107 | B2 * | 12/2007 | Smith | B60N 2/073 297/344.11 |
| 7,475,861 | B2 * | 1/2009 | Chung | B60N 2/0715 248/429 |
| 11,059,390 | B2 | 7/2021 | Hattori et al. | |
| 2020/0238857 | A1 | 7/2020 | Hattori et al. | |
| 2021/0354598 | A1 | 11/2021 | Xiao et al. | |

FOREIGN PATENT DOCUMENTS

| | | | |
|---|---|---|---|
| WO | 2014199757 | A1 | 12/2014 |
| WO | 2021100551 | A1 | 5/2021 |
| WO | 2022067167 | A1 | 3/2022 |

* cited by examiner

RAIL ASSEMBLY FOR A LONGITUDINAL SEAT ADJUSTMENT SYSTEM OF A VEHICLE SEAT, AND VEHICLE SEAT

CROSS-REFERENCE TO RELATED APPLICATION

This application is a continuation, under 35 U.S.C. § 120, of copending International Patent Application PCT/EP2022/082230, filed Nov. 17, 2022, which designated the United States; this application also claims the priority, under 35 U.S.C. § 119, of German Patent Application DE 10 2022 207 168.9, filed Jul. 13, 2022; the prior applications are herewith incorporated by reference in their entirety.

FIELD AND BACKGROUND OF THE INVENTION

The invention relates to a rail assembly for a longitudinal seat adjustment system of a vehicle seat, having a lower rail for fastening to a vehicle floor, and an upper rail which sits in the lower rail, with a form fit, for coupling to the vehicle seat. The invention furthermore relates to a longitudinal seat adjustment system and to a vehicle seat having such a rail assembly.

The front vehicle seats in a motor vehicle, i.e., in particular the driver's seat, are typically longitudinally adjustable in the vehicle longitudinal direction (X) in order to make it possible for vehicle users of different heights to easily operate the accelerator, brake, and possibly clutch pedals. Vehicle seats of this type are therefore adjustable horizontally forward and backward. For this purpose, the vehicle seats are coupled to a manual or else electromotive longitudinal seat adjustment system.

Such a longitudinal seat adjustment system has, as a guide, a rail assembly having at least two seat rails (guide rails, longitudinal adjustment rails). In this case, the seat rails are also referred to as upper rail and lower rail, the lower rail being fastened in a stationary manner to the vehicle floor and the upper rail, which is coupled to the vehicle seat, being mounted displaceably in the lower rail via guide elements. Since the lower rail extends here substantially over the entire adjustment distance, it is frequently also referred to as a long (seat) rail.

The upper rail here generally has, as guide elements, load-bearing load rollers, which are guided on a rail base of the lower rail and which substantially support the weight force of the vehicle seat and of a vehicle user sitting thereon in relation to the lower rail. The upper rail frequently also has, as guide elements, running rollers for improving the freedom from play and the stability, and are used to guide or support the upper rail, for example, on lateral inner walls of the lower rail. The running rollers may also be considered to be compensating rollers for bracing the upper rail in the lower rail.

Currently, the freedom from play of the seat rails is realized via a profile preload of the rails. However, the preloading forces may overload the guide elements of the upper rail, in particular the running rollers. Thus, typically, only small preloading forces are generated in order as far as possible to avoid such overloading of the upper rail running rollers. However, the resultantly reduced preloading forces in the long (lower) rails may lead to the front edge of the upper rail lifting off from the rail base of the lower rail in the event of a load, in particular in a reclined position of the vehicle seat, because of the resultantly acting torque. In other words, the upper rail may be tilted or pivoted within the lower rail. In such a loaded state, the longitudinal adjustment of the seat is possible only with increased effort, or it is even rendered impossible.

SUMMARY OF THE INVENTION

The invention is based on the object of specifying a particularly suitable rail assembly for longitudinal adjustment of the seat. In particular, a displacement force for adjusting a seat is intended not to be affected as far as possible by the seat position of the vehicle seat. Preferably, a displacement force which is as far as possible identical is intended to be made possible for longitudinal adjustment of a vehicle seat into an upright position and into a reclined position. The invention is furthermore based on the object of specifying a particularly suitable longitudinal seat adjustment system for a vehicle seat and a particularly suitable vehicle seat.

With the above and other objects in view there is provided, in accordance with the invention, a rail assembly for a longitudinal seat adjustment system of a vehicle seat, the rail assembly comprising:

- a lower rail for fastening to a vehicle floor, the lower rail having a rail base and defining a rail longitudinal direction;
- an upper rail for coupling to the vehicle seat, the upper rail being formed to sit in the lower rail with a form fit or a partial form fit;
- the upper rail carrying a plurality of load rollers for supporting the upper rail on the rail base of the lower rail displaceably along the rail longitudinal direction;
- the lower rail being formed with a profile longitudinal slot;
- the lower rail and the upper rail being formed with mutually intermeshing form-fitting contours;
- the form-fitting contours of the upper rail engaging over the load rollers and, in a region of the load rollers, being formed with passage openings which are at least partially penetrated by the load rollers or are to be penetrated by the load rollers in an event of a load; and
- the lower rail having supporting edges that face towards the rail base and are aligned in line with the load rollers in a height direction of the rail.

The advantages and refinements cited in respect of the rail assembly can accordingly also be transferred to the longitudinal seat adjustment system and/or to the vehicle seat, and vice versa. The conjunction "and/or" should be understood here and below so as to mean that the features linked by said conjunction can be formed both together and also as alternatives to one another. Similarly, the expression "at least one of A or B," should be understood to mean "A or B or A and B."

The rail assembly according to the invention is provided for a longitudinal seat adjustment system of a vehicle seat and is suitable and designed for this purpose. The rail assembly here has a pair of seat rails with a fixed lower rail (long rail) and an upper rail which is movable with respect thereto. In the assembled state, the lower rail is fixed to a vehicle floor or to a vehicle bodyshell of the motor vehicle, with the upper rail being coupled to the vehicle seat. The upper rail can be coupled here to the vehicle seat, for example, by a seat height adjustment mechanism. The upper rail sits with a form fit in the lower rail. In other words, the upper rail is inserted or pushed with a form fit into the lower rail.

A "form fit" or a "form-fitting connection" between at least two parts connected to each other is understood here and below in particular as meaning that the interconnected parts are held together in at least one direction by contours of the parts themselves directly intermeshing or by them indirectly intermeshing via an additional connecting part. A mutual movement in this direction is therefore “blocked” on account of the shape. These cooperative shapes may also be referred to as “form locking” or as a “positive fit.”

In the following, details in respect of the spatial directions are also specified in particular in a system of coordinates of the motor vehicle (vehicle coordinate system) with regard to an exemplary installation situation of a vehicle front seat, for example a driver’s seat. The abscissa axis (X axis, X direction) is oriented here along the vehicle longitudinal direction (driving direction) and the ordinate axis (Y axis, Y direction) along the vehicle transverse direction, and the applicate axis (Z axis, Z direction) along the vehicle height.

In the assembled or installed state with a horizontal rail longitudinal direction, the lower rail is oriented parallel to the vehicle longitudinal direction (X), with the upper rail being displaceably arranged (linearly) along the rail longitudinal direction. The form fit between the upper rail and the lower rail here is in particular along a vertical rail height direction (i.e. along the vehicle height direction Z) and along a rail transverse direction (i.e. along the vehicle transverse direction Y) of the rail assembly.

The upper rail has a number of load-bearing load rollers, by means of which the upper rail is mounted displaceably along the rail longitudinal direction on a rail base of the lower rail. The upper rail here has, for example, a front pair of load rollers and a rear pair of load rollers. The terms “at the front” or “front” refer here and below in particular to an arrangement oriented to the vehicle front side in the assembled state, the terms “at the rear” or “rear” correspondingly referring to an arrangement oriented to the vehicle rear side in the assembled state.

The lower rail is designed, for example, as a hollow profile with a profile longitudinal slot on the top side, i.e. arranged opposite the rail base. The upper rail here sits at least partially in the profile longitudinal slot. The lower rail and the upper rail here have intermeshing form-fitting contours to realize the form fit in the rail transverse direction and rail height direction. The form-fitting contours therefore prevent the upper rail from undesirably sliding out of the lower rail, in particular in the event of a (vehicle) crash. The form-fitting contours are therefore also referred to as (crash) catch contours.

The form-fitting contours of the upper rail are at least partially arranged in the region of the load rollers and engage over the latter. In other words, the form-fitting contours have horizontally oriented portions which are arranged above the axis of rotation of the load rollers. According to the invention, the form-fitting contours, in particular in the portions engaging over one another horizontally, have passage openings for the respectively associated load roller. The passage openings which are designed for example as cutouts (cut-out openings, apertures) are at least partially penetrated here by the respective load rollers or can be penetrated in the event of a load. The load rollers thus engage in the passage openings at least in the event of a load in such a way that at least part of the load rollers protrudes over an opposite opening edge of the passage opening in the vertical direction (rail height direction). In other words, the form-fitting contours of the upper rail have holes or windows for receiving the load rollers.

According to the invention, the lower rail has a supporting edge which faces the rail base and is aligned with the load rollers or the passage openings in the rail height direction. The load rollers can thus lie against the supporting edge—and therefore against the lower rail. The supporting edge is therefore designed in particular as a running surface for the load rollers. As a result, a particularly suitable rail assembly is realized. In particular, the load rollers are thus designed with a dual action since they are guided on the rail base and/or the supporting edges.

In a preferred embodiment, the load rollers in an unloaded state of the rail assembly are spaced apart from the supporting edges. In other words, a gap, i.e. a clear distance, is provided between the load rollers and the (running) surface of the supporting edge. This means that, in the assembled state, only a certain preloading force acts between the lower rail and the upper rail, and therefore the guide elements of the upper rail are not overloaded. There is therefore a certain amount of play between the lower rail and the upper rail.

In the unloaded state, the load rollers are therefore guided merely on the rail base. In the event of a load in which the upper rail is pivoted along the rail height direction within the lower rail, at least some of the load rollers lift off from the rail base. Such a load or load situation occurs, for example, due to a torque in a reclined position of a vehicle seat supported by the rail assembly, with in particular the front load rollers of the upper rail lifting off. By means of the passage openings, the load rollers in this case come into contact with the supporting edges, and therefore the load rollers can roll along the running surface of the supporting edges. It is thereby possible for the front load-bearing running rollers to slightly lift off during tilting of the upper rail in the overload or load situation and to be supported on the lower rail. During the adjustment of the rail in this state, the running rollers can thus roll along the supporting edge of the lower rail such that a longitudinal adjustment of the seat is possible without an increased displacement force. In particular, even in the event of a relatively small preloading of the rail assembly to compensate for play, the upper rail can be adjusted in the overloaded state in the reclined position. The displacement force remains substantially unchanged in comparison to a displacement force in an upright position of the vehicle seat. The rail assembly therefore has a new function, namely longitudinal adjustment of a seat when a vehicle seat is in a reclined position, without additional components being necessary in this case.

In one conceivable refinement, the longitudinal edges of the profile longitudinal slot are bent to form (crash) catch hooks which intermesh with a form fit with (crash) catch hooks integrally formed on the upper rail. The catch hooks form the form-fitting contours here. The design in the form of catch hooks produces a particularly stable and crash-proof rail assembly.

In one suitable design, the catch hooks are bent approximately in a U shape in cross section, with the horizontal U limbs being oriented parallel to the rail transverse direction and the vertical U limbs being oriented parallel to the rail height direction. The catch hooks intermesh here in such a manner that the respective free-standing vertical U limb engages in the respective other U opening. The catch contour of the lower rail here has, for example, a U shape or U opening opened downward, i.e. oriented toward the rail base, wherein the U shape or the U opening of the upper rail is oriented upward in the direction of the vehicle seat.

In one expedient development, the passage openings are introduced in the region of the horizontal U limbs of the catch hooks on the upper rail side. The passage opening can also extend here into the vertical U limbs. The horizontal U limbs substantially form those portions of the catch hooks which engage over the load rollers, and therefore the arrangement of the passage openings in this region produces reliable access for the load rollers.

In one advantageous embodiment, the end sides of the free-standing vertical U limbs of the catch hooks on the lower rail side form the supporting edges or running surfaces for the load rollers. A particularly compact and effective arrangement is thereby realized.

In order to improve the running stability, the upper rail in particular has a number of obliquely oriented running rollers which lie against obliquely oriented side walls of the lower rail. In the installed state, a bearing part is provided which is arranged on (fastened to) the upper rail and realizes a for articulating an adjustment part of the vehicle seat, e.g. an adjustment lever of a seat adjustment device or a belt buckle of a seat belt.

The adjustment part (pivotably) articulated on the bearing part of the upper rail is a motor vehicle part into which forces increased in the event of a crash are introduced, e.g. by a vehicle occupant located on the corresponding motor vehicle seat.

If the adjustment part is, for example, the belt buckle of a seat belt—adaptable to a respective vehicle occupant by adjustment of the effective belt length—for a vehicle seat, increased belt forces act on the belt buckle in the event of a crash if a vehicle occupant located on the motor vehicle seat is caught by the seat belt. When a seat with an integral belt is used as the vehicle seat, the upper rail and lower rail are therefore mechanically more stable and have a greater material thickness. As a result, however, the preloading forces are also increased, and therefore the running rollers may be overloaded.

An additional or further aspect of the invention therefore makes provision for the running rollers to be mounted resiliently. The cushioning of the running rollers avoids overloading the running rollers in the course of profile preloading in order to compensate for tolerances and play of the rail assembly.

In a particularly suitable refinement, the upper rail has a mechanically stable rail body, at the opposite ends of which respective guide carriages having two load rollers and having two bent spring tabs are arranged, the running rollers being arranged on the spring tabs. This brings about a particularly advantageous division of functions, in which the contradictory requirements imposed on the upper rail, namely a high degree of rigidity in the event of a crash and at the same time as great an elasticity as possible for play-free preloading, are divided between the rail body and the guide carriage. The upper rail is therefore composed of a plurality of components which are preferably configured with respect to geometry and material without making compromises to the respective requirements. The upper rail is therefore designed in particular as an upper rail assembly.

The rail body which is, for example, approximately U-shaped in cross section forms the part of the upper rail with crash-relevant borders and is produced from a comparatively thick and solid material. The rail body is connected to two guide carriages. The guide carriages are each equipped with load-bearing load rollers and running rollers placed obliquely thereon, with the resilient design of the spring tabs resulting in reliable cushioning for the running rollers. The spring tabs and the material thereof are configured here for a desired or defined (profile) preloading. Preferably, the individual parts of the upper rail assembly are of slender design in terms of function and arranged nested compactly in one another.

With the above and other objects there is also provided, in accordance with the invention, a rail assembly for a longitudinal seat adjustment system of a vehicle seat is proposed, having a lower rail for fastening to a vehicle floor, and an upper rail which sits in said lower rail, preferably with a form fit or partial form fit, for coupling to the vehicle seat, wherein the upper rail has at least one load roller, by means of which the upper rail is mounted displaceably along a rail longitudinal direction on a rail base of the lower rail, wherein the lower rail has a profile longitudinal slot, wherein the upper rail comprises a rail body and at least two guide carriages, the at least two guide carriages each being connected to the rail body, and wherein at least one load roller and at least one running roller are rotatably attached to each of the guide carriages.

Optionally, the lower rail and the upper rail can have intermeshing form-fitting contours. Furthermore optionally, the form-fitting contours of the upper rail can engage over the at least one load roller.

Each guide carriage has a carriage body to which the load rollers and running rollers are rotatably connected.

This refinement according to the invention of a rail assembly with a multi-part upper rail has the advantage that functions are separated by division of the upper rail into the rail body and the at least two guide carriages. By means of this modular design, a simpler formation of variants of different upper rails is possible. The preferably continuous rail body is the component which is load-bearing in the event of a crash, with the guide carriages serving predominantly for guiding the upper rail in the lower rail. The number of guide carriages can therefore also depend on the intended overall length of the upper rail. Depending on the length and required strength, different rail bodies and guide carriages can also be combined with one another in order to provide a complete upper rail.

In order to better guide the upper rail in the lower rail, at least one of the guide carriages can have two load rollers and/or two running rollers. Preferably, the load rollers can be designed as a pair of load rollers arranged on opposite side walls of the carriage body, and/or the running rollers can be designed as a pair of running rollers arranged on opposite side walls of the carriage body. It is particularly advantageous here if two different types of roller are arranged on a guide carriage, i.e. in particular on a carriage body. The guide carriage therefore forms a finished assembly, with the alignment of the two types of roller with respect to one another no longer needing to be coordinated during the assembly.

According to an advantageous development, an axis of rotation of the load roller and an axis of rotation of the running roller can be offset by an angle to each other, preferably with there being an angle of less than 90 degrees between the axes of rotation.

In order to optimally guide the upper rail in the lower rail, at least one load roller and at least one running roller can be rotatably attached to both of the at least two of the guide carriages. Preferably, each guide carriage in each case has a pair of running rollers and a pair of load rollers.

In order to improve the smoothness of running of the upper rail within the lower rail, the at least two guide carriages can be attached spaced apart from one another to the rail body, in particular welded and/or screwed thereto. In the region of the guide carriages, the upper rail can therefore have a greater wall thickness than in regions without guide carriages, i.e. in regions which are preferably formed by the rail body.

Alternatively or in addition, in order to improve the smoothness of running, provision may be made for the at least two guide carriages to each be attached in an end portion of the rail body. Preferably, the at least two guide carriages are arranged at two different end portions of the rail body.

In order to reduce costs for the production, provision may be made for the rail body to be longer in a rail longitudinal direction than a guide carriage.

According to a particularly advantageous refinement, provision may be made for a length of the upper rail in the rail longitudinal direction to be determined by the length of the rail body.

In order to reduce the production costs, provision may be made, according to a further advantageous refinement, for a diameter of the load rollers to in each case be larger than a diameter of the running rollers. Alternatively, the load rollers and the running rollers can also have an identical diameter. This has the advantage that identical parts are used.

According to a particularly advantageous development, provision may be made for the at least one load roller and the at least one running roller to be rotatably connected to portions of the carriage body that are decoupled from one another. In particular, the portions can be decoupled from one another by at least one gap. Preferably, the portions can be formed by two side walls of the carriage body that are separated from each other by a gap. It is therefore possible to set up different supports and/or load dissipations by means of the portions.

According to a further preferred refinement, provision may be made for a portion of the carriage body bearing the at least one load roller to be a U profile in cross section. A dimensionally stable carrying structure which nevertheless can be produced cost-effectively can therefore be provided.

According to another preferred refinement, provision may be made for a portion of the carriage body bearing the at least one running roller to be a W profile in cross section, and/or for a portion of the carriage body bearing the at least one running roller to have a spring tab. An at least partially resilient portion for connecting the running rollers can therefore be set up in a simple and cost-effectively producible way.

For improved load absorption of the upper rail and bracing of the upper rail in the lower rail, a portion of the carriage body bearing the at least one load roller, preferably the side walls assigned to the portion, and a portion of the carriage body bearing the at least one running roller, preferably the side walls assigned to the portion, can be oriented in different directions. Preferably, the portions can be oriented in opposite or virtually opposite directions.

According to an advantageous development, a portion of the carriage body bearing the at least one load roller, preferably the side walls assigned to the portion, can extend downward.

According to a further advantageous development, a portion of the carriage body bearing the at least one running roller, preferably the side walls assigned to the portion, can extend upward.

According to a particularly preferred refinement, at least one load roller can be configured for load absorption and the at least one running roller can be configured for bracing the upper rail with the lower rail. For example, the running roller can be configured for improved compensation for play by being connected to a spring element, preferably to a free end of a spring element. For example, the side walls of the portion bearing the running rollers can be designed as spring elements.

In order to bring about special desired properties in the upper rail simply and cost-effectively, a carriage body can be produced from a different material than the rail body. Alternatively or additionally, the carriage body and the rail body can have a different material thickness and/or different flexibility. Different functions can therefore be carried out by the rail body and the carriage body, with the upper rail connected to form an assembly or a partial assembly carrying out both functions. The rail body is the load-bearing structure and the carriage body the structure for eliminating play.

It can be particularly advantageous if a spring characteristic of the portions of the carriage body is defined by an extent of the respective portion in the rail longitudinal direction, and/or if the portion bearing the at least one load roller in the rail longitudinal direction has a wider than or identical extent to the portion of the carriage body bearing the at least one running roller. Thus, by using a standard basic body for forming the carriage body and by forming the portions from said basic body to meet requirements, portions can be formed with desired properties without a combination of different basic bodies being required. For example, the basic body used can be a U profile which is divided into at least two portions, preferably into three portions, with the side walls of the region being able to be shaped differently and/or bent over differently. This permits cost-effective manufacturing of the carriage body from an integral and/or monolithic basic body.

According to one development, the side walls of the portion of the carriage body bearing the at least one load roller and of the portion of the carriage body bearing the at least one running roller can have an identical, preferably consistent, material thickness. This permits simple and cost-effective manufacturing of the guide carriage from a standard material.

According to another development, the side walls of the portion of the carriage body bearing the at least one load roller and of the portion of the carriage body bearing the at least one running roller can have a different material thickness.

It can be provided that the load rollers are connected in pairs to opposite side walls of the portion of the carriage body bearing the load rollers, wherein the axles of the two load rollers are separated from each other, in particular in such a manner that, between the connecting points and/or the side walls, a clearance, in particular an axle-free space, is formed within the guide carriage. This has the advantage that, in comparison to refinements with a continuous axle, additional construction space is created between the rollers, in particular between the side walls of the carriage body bearing the rollers.

According to a further advantageous refinement, provision may be made for at least one functional unit, in particular at least one functional unit selected from a transmission and/or locking device and/or damper, to be arranged on the rail body and/or between the guide carriages. Therefore, a greater space is available for the arrangement of the functional unit than if the functional unit were arranged in a guide carriage.

The longitudinal seat adjustment system according to the invention is provided for a vehicle seat, in particular for a front vehicle seat, of a motor vehicle and is suitable and designed for this purpose. The longitudinal seat adjustment system here has an above-described rail assembly. The rail assembly realizes a particularly suitable longitudinal adjustment of the seat, in which a reliable and simple longitudinal adjustment of the seat is made possible even in a reclined position of the vehicle seat.

The vehicle seat according to the invention is in particular a front seat of a motor vehicle. The vehicle seat here has an above-described longitudinal seat adjustment system and an above-described rail assembly. A particularly suitable vehicle seat is thereby realized.

Other features which are considered as characteristic for the invention are set forth in the appended claims.

Although the invention is illustrated and described herein as embodied in a rail assembly for a longitudinal seat adjustment system of a vehicle seat, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

Mutually corresponding parts and sizes are provided with the same reference signs throughout the figures.

DETAILED DESCRIPTION OF THE INVENTION

Figure 1:
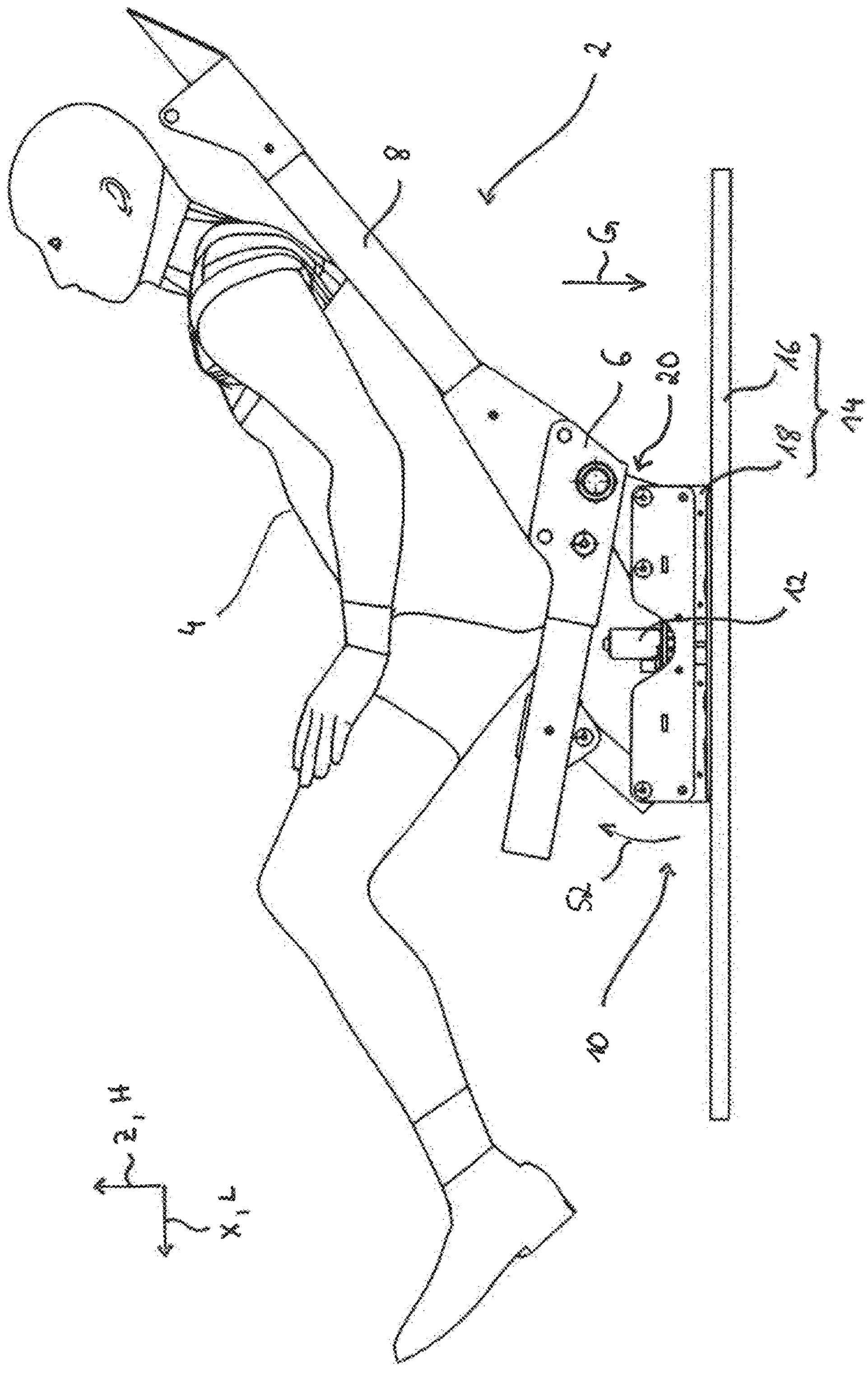
FIG. 1 shows a side view of a vehicle seat with a vehicle user.

Referring now to the figures of the drawing in detail and first, in particular, to FIG. 1 thereof, there is shown a bodyshell of a vehicle seat 2 without seat upholstery and without a seat cover, and a vehicle user 4 sitting on the seat. The vehicle seat 2 has a seat part 6 and a tiltable seat back (backrest) 8. In FIG. 1, the vehicle seat 2 is illustrated in a reclined position with a rearwardly inclined seat back 8.

In the following, details in respect of the spatial directions are also specified in particular in a system of coordinates of the motor vehicle (vehicle coordinate system) with regard to an exemplary installation situation of a vehicle front seat, for example a driver's seat. The abscissa axis (X axis, X direction) is oriented here along the vehicle longitudinal direction (driving direction) and the ordinate axis (Y axis, Y direction) along the vehicle transverse direction, and the applicate axis (Z axis, Z direction) along the vehicle height.

The vehicle seat 2 has a floor assembly in the form of an electromotive longitudinal seat adjustment system 10. The longitudinal seat adjustment system 10 has an electric motor 12 as part of a spindle drive, not shown specifically, and a rail assembly 14.

Figure 2:
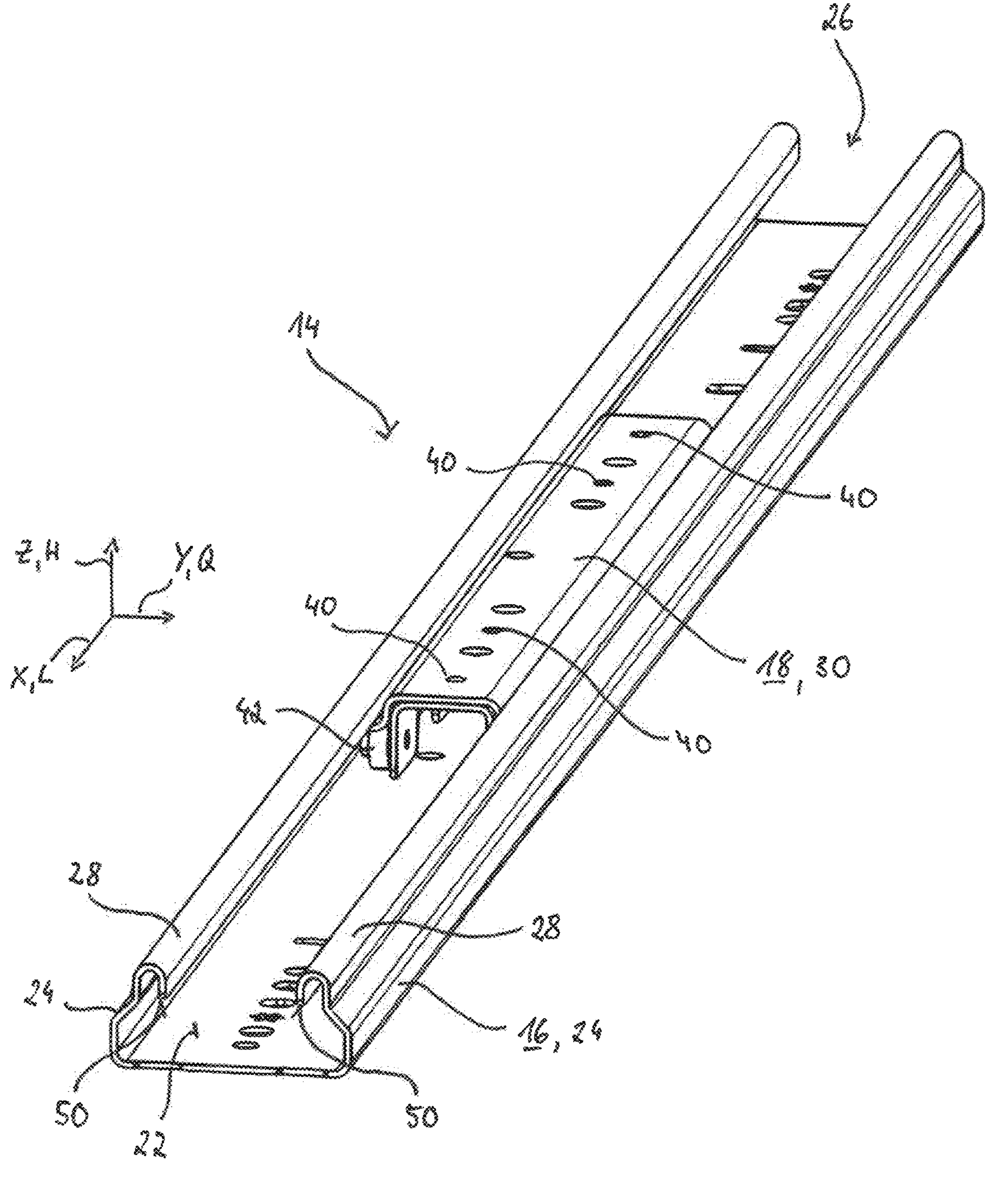
FIG. 2 shows a perspective illustration of a rail assembly of a longitudinal seat adjustment system of the vehicle seat.
Figure 3:
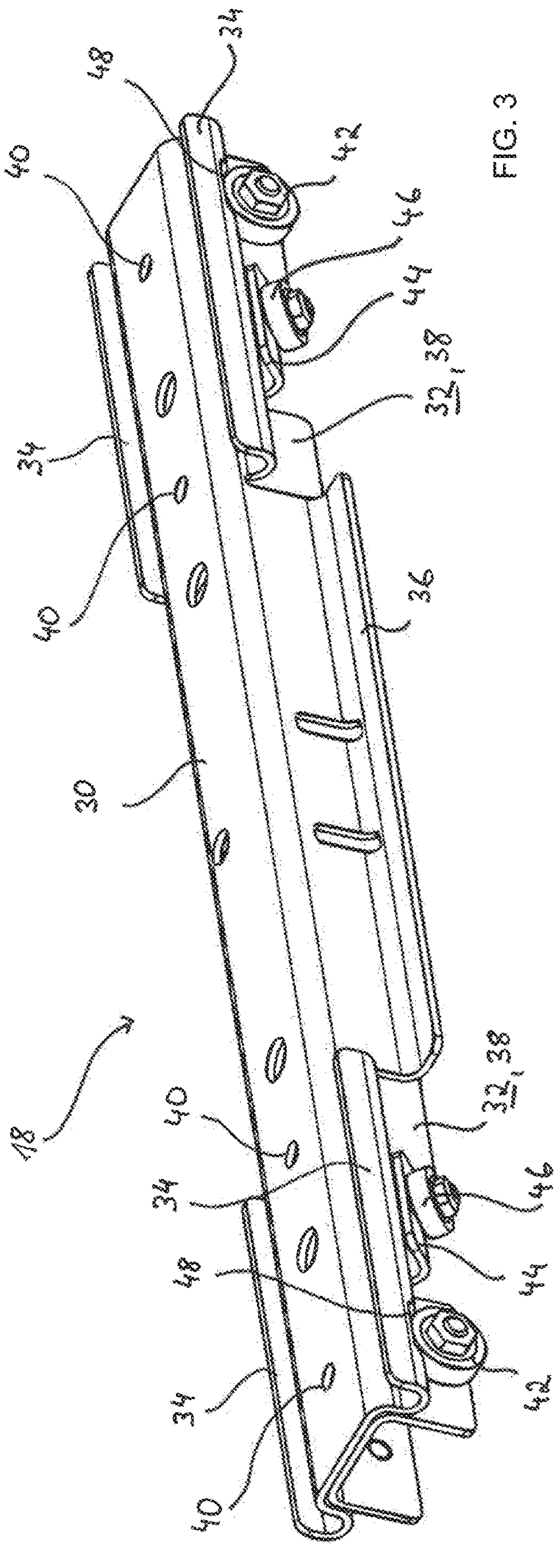
FIG. 3 shows a perspective illustration of an upper rail of the rail assembly.
Figure 4:
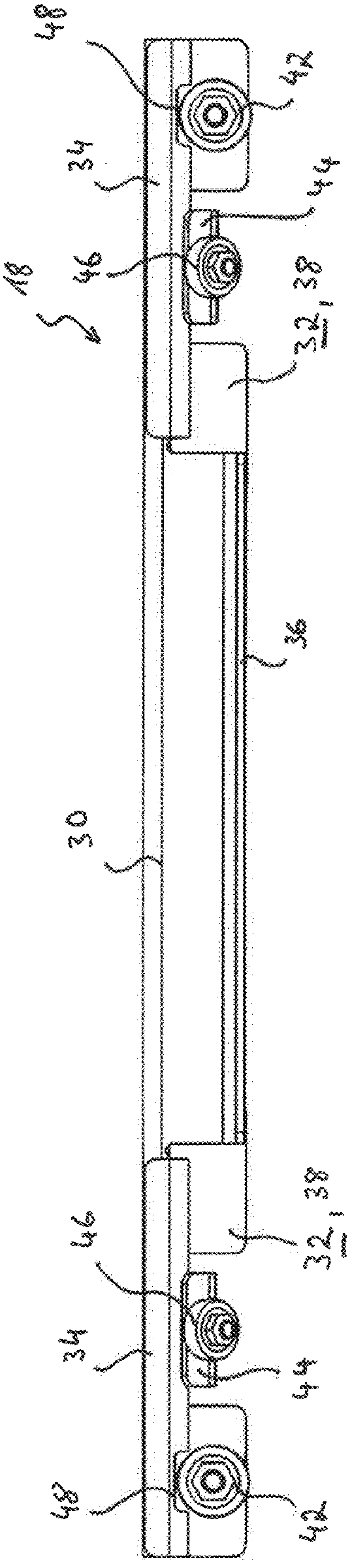
FIG. 4 shows a side view of the upper rail.

The rail assembly 14, which is illustrated individually in FIG. 2, has a lower rail 16, which is in the form of a long rail, and an upper rail 18, which is mounted displaceably therein. In the assembled state, the lower rail 16 is fixed to a vehicle floor or to a vehicle bodyshell of the motor vehicle, with the upper rail 18 being hingedly coupled to the seat part 6 via a seat substructure 20 (cf. FIG. 1). The seat substructure 20 is designed, for example, as a seat height adjustment system.

In the assembled or installed state with a horizontal rail longitudinal direction L, the lower rail 16 is oriented parallel to the vehicle longitudinal direction (X), with the upper rail 18 being displaceably arranged (linearly) along the rail longitudinal direction L. A rail height direction H is oriented here parallel to the vehicle height direction Z, with a rail transverse direction Q being arranged parallel to the vehicle longitudinal direction Y.

The lower rail 16 is designed as a hollow profile with a rail base 22 and with side walls 24 and also with a profile longitudinal slot 26 on the top side, i.e. arranged opposite the rail base 22. The edges of the side walls 24 laterally delimiting the profile longitudinal slot 26 are bent in a U shape to form (crash) catch hooks 28. The U shape of the catch hooks 28 is open downward in the direction of the rail base 22; this means that the vertical U limbs are arranged below the horizontal U limb. The vertical U limbs arranged on the outer side in the rail transverse direction Q are formed by the side walls 24, with the inner vertical U limbs being freestanding and laterally delimiting the profile longitudinal slot 26.

The side walls 24 each have a portion oriented vertically along the rail height direction H and a portion which is adjusted or inclined inward with respect thereto in the rail transverse direction Q, and the inwardly bent catch hooks 28 on the free end side.

The design of the upper rail 18 is explained in more detail below with reference to FIGS. 3 to 6.

Figure 5:
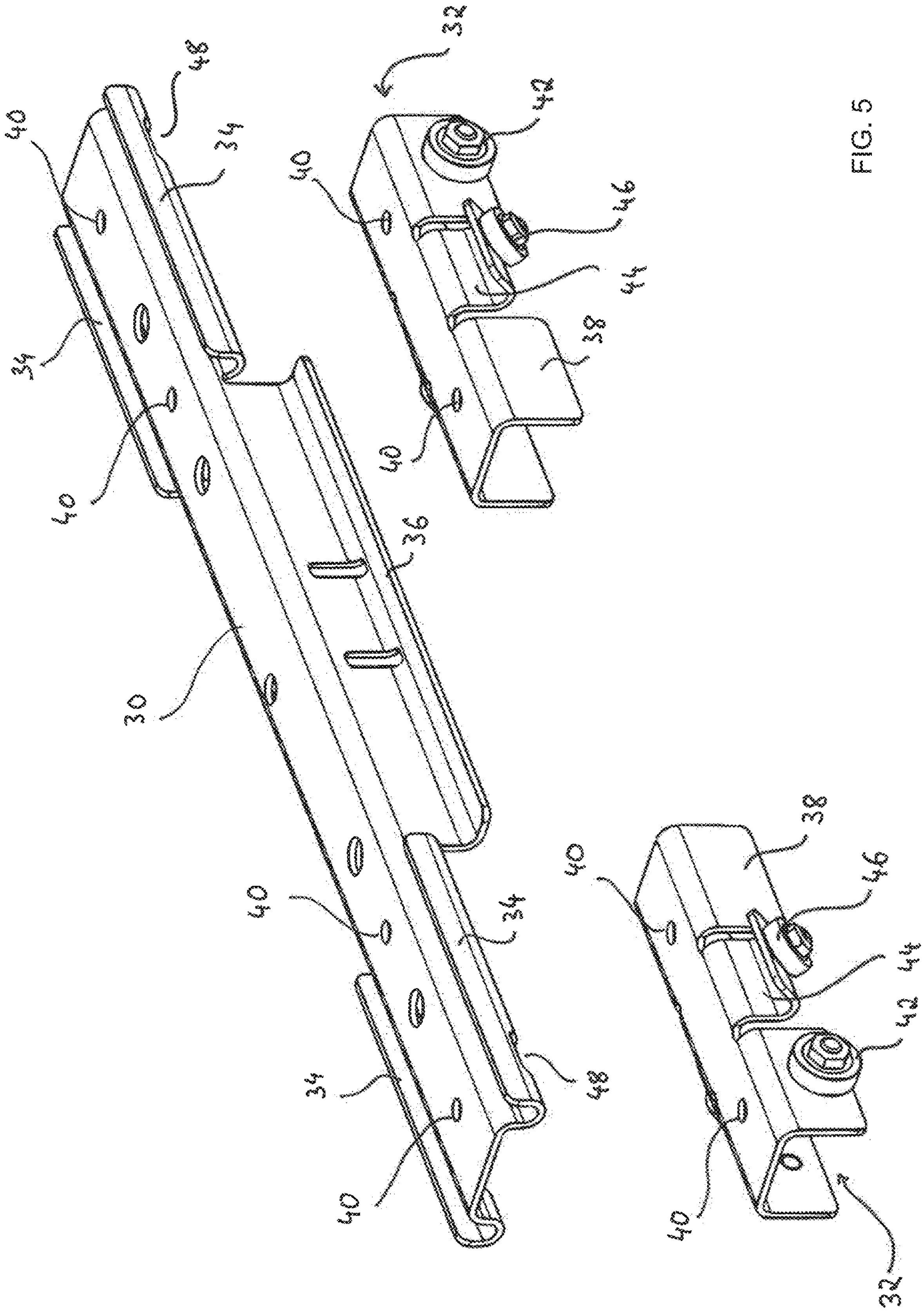
FIG. 5 shows a perspective exploded illustration of the upper rail.

As can be seen in particular in FIG. 5, the upper rail 18 is designed as a multi-part upper rail assembly with a rail body 30 and with two guide carriages 32. The rail body 30 is formed from a comparatively stable and mechanically stiff material.

The elongate rail body 30 extends along the rail longitudinal direction L and, in a sectional plane QH oriented vertically thereto, has a substantially U-shaped cross-sectional shape, wherein the U shape is oriented to be open toward the rail base 22 in the assembled state. The guide carriages 32 are arranged nested substantially compactly in the U opening in the rail body 30 at the opposite end sides of the rail body 30.

The vertical U limbs of the rail body 30 are bent upward in a U shape in the region of the guide carriages 32, and form catch hooks 34 on the upper rail side.

The vertical U limbs of the rail body 30 have an extension 36 which is oriented outward on the free end side between the catch hooks 34 such that the vertical U limbs of the rail body 30 are approximately L-shaped in the central region of the rail body 30. The extensions 36 serve here to vertically support the rail body 30 on the rail base 22 in the event of a vertical overload.

Figure 6:
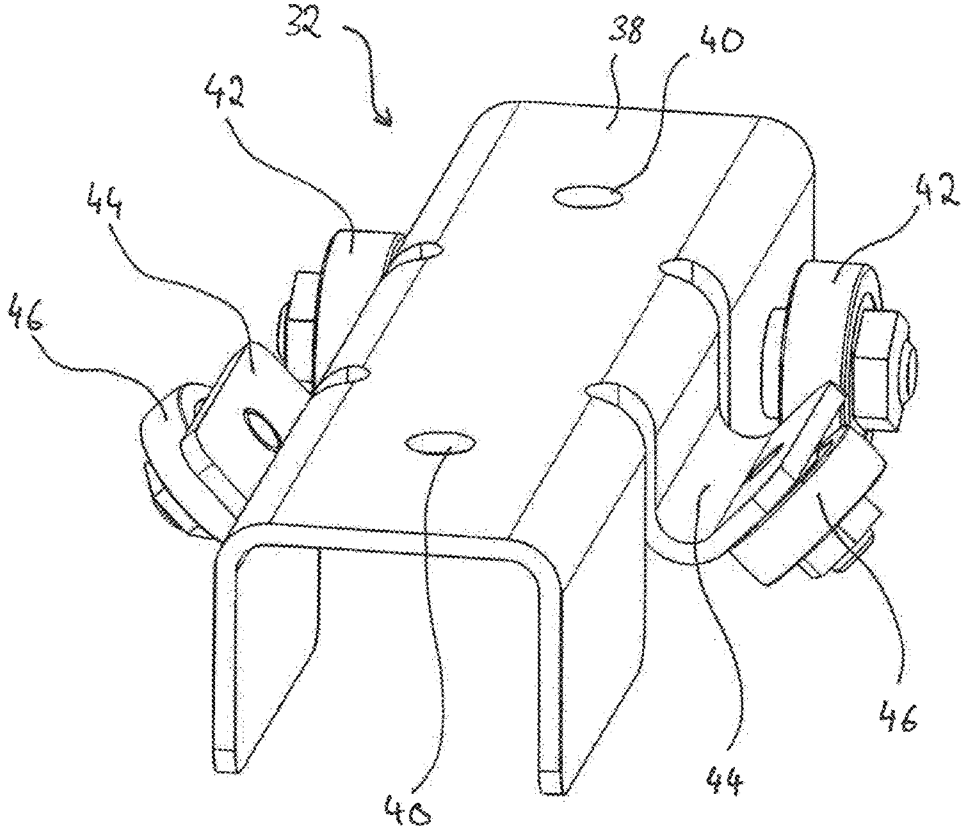
FIG. 6 shows a perspective illustration of a guide carriage of the upper rail.

The guide carriage 32, which is illustrated individually in FIG. 6, has an at least partially approximately U-shaped carriage body 38. The carriage body 38 is produced from a material which is more elastic than the material of the rail body 30. The rail body 30 and the carriage body 38 can also be produced from the same material, with the rail body 30 and the carriage body 38 having different thicknesses or material thicknesses such that the rail body 30 is preferably always more stable or more stiff than the carriage body 38. An embodiment in which the rail body 30 and the carriage body 38 are produced from the same material with the same material thickness is also conceivable, for example.

The carriage bodies 38 are joined, in particular screwed, to the horizontal U limbs with the horizontal U limb of the rail body 30. For this purpose, the carriage bodies 38 and the rail body 30 have aligned assembly openings 40 in the region of the horizontal U limbs. Alternatively, the carriage bodies 38 can be welded or riveted to the rail body 30. During the welding, the assembly openings 40, which are in the form of bores, are used, for example, for positioning the parts in the welding device.

The carriage bodies 38 each have two load-bearing load rollers 42 which are each rotatably arranged opposite each other on one of the vertical U limbs.

The carriage bodies 38 can essentially have at least two portions following one another along the rail longitudinal direction L. The portions are decoupled from one another, for example by a gap situated between the side walls of the portions. The running rollers 46 and the load rollers 42 are each rotatably attached to the individual side walls of the portions. A portion bearing the load rollers 42 is connected via an uninterrupted connecting region to a portion bearing the running rollers 46. The running rollers 46 can be arranged on spring tabs 44, as is described even more precisely below.

According to an embodiment variant shown in the figures, the carriage bodies 38 essentially have three portions of identical length following one another along the rail longitudinal direction L. The outer portions here are substantially identical, with the load rollers 42 being arranged on the portion which is oriented in the direction of the respective end of the rail body 30. In the central portion, the vertical U limbs of the carriage body 38 are provided as spring tabs 44 and bent outward and upward.

Figure 7:
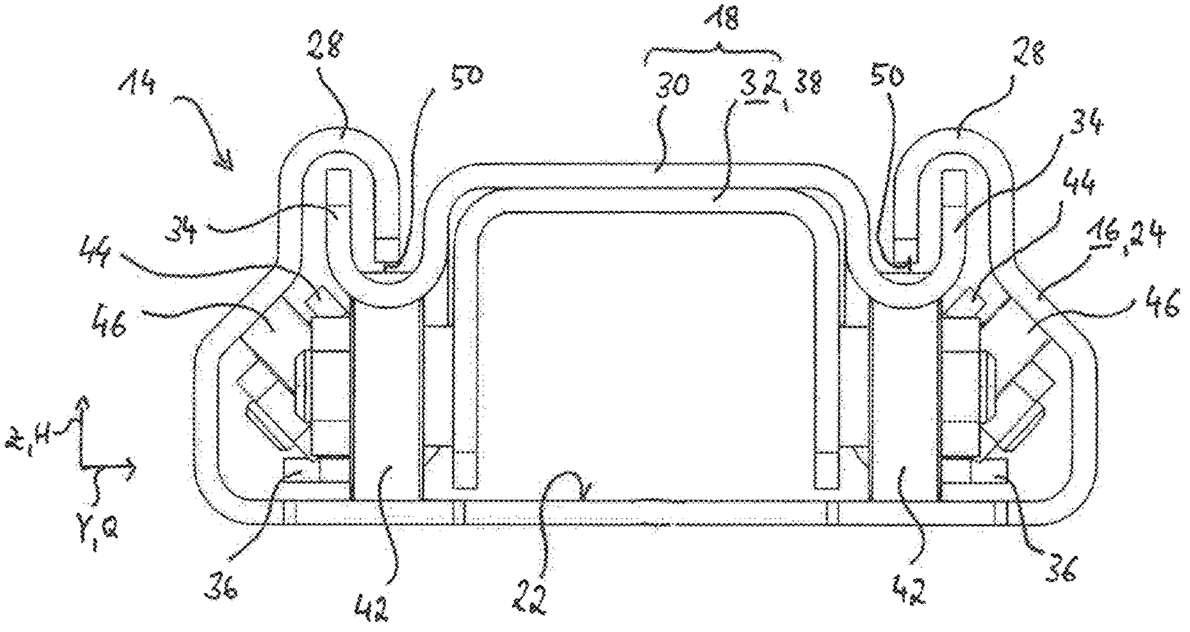
FIG. 7 shows a sectional illustration of the rail assembly.

The spring tabs 44 are bent inclined at an angle with respect to the vertical U limbs of the carriage body 38. For example, the spring tabs 44 have an angle of less than 90°, in particular less than 75°, preferably approximately 45°, with respect to the rail height direction H. A running roller 46 is in each case rotatably attached on the free end side to the spring tabs 44. In the assembled state, the running roller 46 bears against the obliquely oriented portion of the side wall 24 (FIG. 7). As a result of the design of the spring tabs 44, the running rollers 46 are arranged here in particular so as to lie resiliently against the side wall 24. As can be seen for example in FIG. 3, the spring tabs 44 are bent here in such a way that they engage around the outer side of the catch hook 34, and therefore the running rollers 46 are arranged without colliding outside the catch hooks 34.

In the assembled state, the load rollers 42 are arranged below the catch hooks 34. The load rollers 42 are arranged here in particular below the horizontal U limb of the catch hooks 34 in the rail height direction H. Passage openings 48 in the form of a cut-out opening or aperture, in which the load rollers 42 partially engage, are introduced here into the catch hooks 34, in particular into the outer side vertical U limb and the horizontal U limb. In particular, the load rollers 42 partially reach through the passage openings 48 of the catch hooks 34 such that the load rollers 42 partially protrude over the horizontal U limb of the catch hook 34 in the rail height direction H (FIG. 7).

As can be seen in particular in FIG. 7, the upper rail 18 sits with a form fit in the lower rail 16. The form fit is oriented here in particular along the vertical rail height direction H (i.e. along the vehicle height direction Z) and along the rail transverse direction Q (i.e. along the vehicle transverse direction Y) of the rail assembly 14. In order to realize said form fit, the catch hooks 28 and 34 engage in each other as form-fitting contours in such a way that the respective free-standing (inner side) vertical U limb engages in the respective other U opening. The end surfaces of the free-standing vertical U limb of the catch hooks 28 is arranged here opposite to or axially aligned with the running surfaces of the load rollers 42. The end surfaces here each form a supporting edge 50 of the lower rail 16 for the running rollers 42 of the upper rail 18.

In an unloaded state of the rail assembly 14, the running surfaces of the load rollers 42 are spaced apart from the running surface of the supporting edges 50. In the unloaded state, the load rollers 42 are therefore merely guided on the rail base 22.

In the reclined position of the vehicle seat 2, because of the body weight of the vehicle user 4 a weight force G acts on the rear part of the upper rail 18. The weight force G therefore acts offset to the center of gravity of the upper rail 18 such that a torque results. This torque pivots the front part of the upper rail 18 upward. The pivoting is shown in FIG. 1 by an arrow 52.

The loading with the weight force G causes the upper rail 18 to pivot along the rail height direction H within the lower rail 16 such that the front load rollers 42 lift off from the rail base 22. Through the passage openings 48, the load rollers 42 therefore come into contact with the supporting edges 50, and therefore the load rollers 42 are supported on the supporting edges 50 and can roll along them. It is thereby possible that, when the upper rail 18 tilts in the event of an overload or load, the front load-supporting running rollers 42 slightly lift off and are supported on the lower rail 16. When the upper rail 18 is adjusted in this state, the running rollers 42 can therefore roll on the supporting edge 50 of the lower rail 16 such that a longitudinal adjustment of the seat is possible without an increased displacement force. In particular, even in the event of a smaller preload of the rail assembly 14 to compensate for play, an adjustment of the upper rail 16 in the reclined position of the vehicle seat 2 is therefore made possible.

The claimed invention is not limited to the above-described exemplary embodiment. On the contrary, other variants of the invention can also be derived therefrom by a person skilled in the art within the scope of the disclosed claims without departing from the subject matter of the claimed invention. In particular, furthermore, all of the individual features described in conjunction with the exemplary embodiment within the scope of the disclosed claims can also be combined in a different way without departing from the subject matter of the claimed invention.

In particular, the embodiment of the upper rail 18 is inventive just by itself and therefore constitutes a separate invention.

The following is a summary list of reference numerals and reference signs and the corresponding structure used in the above description of the invention:

2 vehicle seat
4 vehicle user
6 seat part
8 seat back
10 longitudinal seat adjustment system
12 electric motor
14 rail assembly
16 lower rail
18 upper rail
20 seat substructure
22 rail base
24 side wall

26 profile longitudinal slot
28 catch hook
30 rail body
32 guide carriage
34 catch hook
36 extension
38 carriage body
40 assembly opening
42 load roller
44 spring tab
46 running roller
48 passage opening
50 supporting edge
52 arrow
X vehicle longitudinal direction
Y vehicle transverse direction
Z vehicle height direction
L rail longitudinal direction
Q rail transverse direction
H rail height direction
G weight force

The invention claimed is:

1. A rail assembly for a longitudinal seat adjustment system of a vehicle seat, the rail assembly comprising:
- a lower rail for fastening to a vehicle floor, said lower rail having a rail base and defining a rail longitudinal direction;
- an upper rail for coupling to the vehicle seat, said upper rail being formed to sit in said lower rail with a form fit or a partial form fit;
- said upper rail carrying a plurality of load rollers for supporting said upper rail on said rail base of said lower rail displaceably along the rail longitudinal direction;
- said lower rail being formed with a profile longitudinal slot;
- said lower rail and said upper rail being formed with mutually intermeshing form-fitting contours;
- said form-fitting contours of said upper rail engaging over said load rollers and, in a region of said load rollers, being formed with passage openings which are at least partially penetrated by said load rollers or are to be penetrated by said load rollers in an event of a load; and
- said lower rail having supporting edges that face towards said rail base and are aligned in line with said load rollers in a height direction of said rail.

2. The rail assembly according to claim 1, wherein said load rollers in an unloaded state are spaced apart from said supporting edges.

3. The rail assembly according to claim 1, wherein said longitudinal edges of said profile longitudinal slot are bent to form catch hooks which intermesh with a form fit with catch hooks integrally formed on said upper rail as form-fitting contours.

4. The rail assembly according to claim 3, wherein said catch hooks of said lower rail and of said upper rail are bent in a U-shape, and said catch hooks intermesh by engagement of a respective free-standing vertical U-limb with a respectively opposite U-opening.

5. The rail assembly according to claim 4, wherein said passage openings are introduced in a region of the horizontal U-limbs of said catch hooks of said upper rail.

6. The rail assembly according to claim 4, wherein said supporting edges are formed by end sides of the free-standing vertical U-limbs of said catch hooks on said lower rail.

7. The rail assembly according to claim 1, wherein said upper rail has a plurality of obliquely oriented running rollers which lie resiliently against obliquely oriented side walls of said lower rail.

8. The rail assembly according to claim 7, wherein said upper rail has a mechanically stable rail body and respective guide carriages at opposite ends of said rail body, said guide carriages carrying two load rollers and having two bent spring tabs carrying said running rollers.

9. A rail assembly for a longitudinal seat adjustment system of a vehicle seat, the rail assembly comprising:
- a lower rail for fastening to a vehicle floor, said lower rail having a rail base and defining a rail longitudinal direction;
- an upper rail for coupling to the vehicle seat, said upper rail being formed to sit in said lower rail with a form fit or a partial form fit;
- said upper rail being displaceably supported on said rail base of said lower rail along the rail longitudinal direction by at least one load roller;
- said lower rail being formed with a profile longitudinal slot;
- said upper rail having a rail body and at least two guide carriages connected to said rail body; and
- each of said guide carriages having at least one said load roller for supporting said upper rail on said lower rail and at least one running roller rotatably attached thereto.

10. The rail assembly according to claim 9, wherein at least one of said guide carriages has two load rollers and/or two running rollers, the two load rollers being a pair of load rollers arranged on opposite side walls of a respective said carriage body, and said two running rollers being a pair of running rollers arranged on opposite side walls of a respective said carriage body.

11. The rail assembly according to claim 9, wherein an axis of rotation of said load roller and an axis of rotation of said running roller are angularly offset by a given angle relative to one another.

12. The rail assembly according to claim 9, wherein at least one load roller and at least one running roller are rotatably attached to each of said at least two guide carriages.

13. The rail assembly according to claim 9, wherein said at least two guide carriages are attached to said rail body of said upper rail spaced apart from one another.

14. The rail assembly according to claim 9, wherein each of said at least two guide carriages is attached at an end portion of said rail body.

15. The rail assembly according to claim 9, wherein said rail body is longer in a rail longitudinal direction than a respective said guide carriage.

16. The rail assembly according to claim 9, wherein a length of said upper rail in the rail longitudinal direction is determined by a length of said rail body.

17. The rail assembly according to claim 9, wherein a diameter of said load rollers is larger than a diameter of said running rollers, or wherein the diameter of said load rollers and the diameter of said running rollers are identical.

18. The rail assembly according to claim 9, wherein said at least one load roller and said at least one running roller are rotatably connected to portions of a carriage body that are decoupled from one another.

19. The rail assembly according to claim 9, wherein a portion of said carriage body bearing said at least one load roller is a U profile in cross section.

20. The rail assembly according to claim 9, wherein a portion of said carriage body bearing said at least one running roller is a W profile in cross section, and/or wherein a portion of said carriage body bearing said at least one running roller has a spring tab.

21. The rail assembly according to claim 9, wherein a portion of said carriage body bearing said at least one load roller and a portion of said carriage body bearing said at least one running roller are oriented in different directions.

22. The rail assembly according to claim 9, wherein a portion of said carriage body bearing said at least one load roller extends substantially downward.

23. The rail assembly according to claim 9, wherein a portion of said carriage body bearing said at least one running roller extends substantially upward.

24. The rail assembly according to claim 9, wherein said at least one load roller is configured for load absorption and said at least one running roller is configured for bracing said upper rail against said lower rail to compensate for play.

25. The rail assembly according to claim 9, wherein said carriage body is produced from a different material than a material of said rail body and/or said carriage body has a different material thickness than said rail body.

26. The rail assembly according to claim 9, wherein a spring characteristic of portions of said carriage body is defined by an extent of the respective said portion in the rail longitudinal direction, and/or the respective said portion of said carriage body bearing said at least one load roller in the rail longitudinal direction has a wider or identical extent to the respective said portion of said carriage body bearing said at least one running roller.

27. The rail assembly according to claim 9, wherein a material thickness of side walls of the respective said portion of said carriage body bearing said at least one load roller and a material thickness of side walls of the respective said portion of said carriage body bearing said at least one running roller are identical to one another.

28. The rail assembly according to claim 9, wherein a material thickness of side walls of the respective said portion of said carriage body bearing said at least one load roller and a material thickness of side walls of the respective said portion of said carriage body bearing said at least one running roller are different from one another.

29. The rail assembly according to claim 9, wherein said load rollers are connected in pairs to mutually opposite side walls of the respective said portion of said carriage body bearing said load rollers, wherein said pair of load rollers have axles that are separated from one another.

30. The rail assembly according to claim 29, wherein said axles of said pair of load rollers are disposed with a clearance between connecting points and/or side walls, to form an axle-free space within said guide carriage.

31. The rail assembly according to claim 9, which further comprises at least one functional unit selected from the group consisting of a transmission, a locking device, and a damper arranged on said rail body and/or between said guide carriages.

32. A longitudinal seat adjustment system for a vehicle seat of a motor vehicle, the longitudinal seat adjustment system comprising a rail assembly according to claim 1.

33. A vehicle seat for a motor vehicle, comprising a rail assembly according to claim 1.

* * * * *